Patented Apr. 13, 1937

2,076,884

UNITED STATES PATENT OFFICE 2,076,884

METHOD OF PRODUCING A DOLOMITE BRICK

Jules Ernould, Longwy, France, assignor to Societe des Hauts Fourneaux de la Chiers, a corporation of France No Drawing. Application April 18, 1935, Serial No. 17,152. In France November 24, 1934

21 Claims. (Cl. 18—47.5)

It has already been attempted to manufacture dolomite bricks, but it had never been possible, before the applicant, to commercially manufacture bricks having the necessary qualities and, in particular, that of suitably resisting to hydration and erosion.

The present invention relates to a new commercial product constituted by a brick having the colour, appearance, hardness and most of the properties of magnesia bricks, but which is obtained from fritted dolomite. This new dolomite brick has, moreover, a very high resistance to hydration and temperature.

The invention also relates to a process for the manufacture of a dolomite brick having the characteristic features indicated above. This process is essentially characterized by the fact that it is a process of manufacture carried out in the dry state; it presents, moreover, the following characteristic features considered separately or in combination:

(1) The thoroughly fritted dolomite is reduced to an impalpable powder, such as that capable of passing through a sieve having 6.000 to 20.000 meshes per square centimeter, according to circumstances;

(2) To this very finely pulverized material is added a small percentage of iron oxide, chromium oxide or of any other similar oxide pulverized to a very great fineness of the order of that indicated above, this oxide being suitably mixed with the finely pulverized dolomite;

(3) The mixture of materials above mentioned is then agglomerated in the dry state, without adjunction of any binder (which is possible owing to the condition of extreme fineness of the materials in presence) by means of a press allowing to submit the material undergoing moulding to extremely high pressures of the order of 300 to 1,000 kgs. per square centimeter (and which can even exceed this latter figure) according to the shape and dimensions of the refractory articles it is desired to obtain;

(4) When issuing from the presses, the articles are introduced in a suitable kiln allowing to effect burning in a single operation and to obtain a perfect ceramic agglomeration, reactions taking place during burning between the dolomite and the metallic oxides above mentioned, this giving rise to ferrites or chromites of magnesia or lime imparting to the material all the properties of a basic refractory product of very high grade.

It is to be noted that, when the materials (fritted dolomite and metal oxide) used for the manufacture of the dolomite brick forming the subject-matter of the invention are not immediately used, they must preferably be maintained at a certain temperature for preventing absorption of moisture by these materials.

As stated in the foregoing, for obtaining the fritted dolomite brick forming the subject-matter of the invention, the dolomite is first ground until it is reduced to an impalpable powder such as that capable of passing through a suitable sieve the number of which might be comprised between 100 and 250.

This reduction of the fritted dolomite to a very finely divided condition can be effected by any suitable means, but, preferably, by a crusher suitably devised with sorting by air and removal of gases from the pulverulent material.

To this very finely pulverized material is added a very small percentage of pure iron oxide or pure chromium oxide (or of any other similar metal oxide). However, it is to be noted that, according to the quality of the product it is desired to obtain, slags or dust rich in iron or chromium and ground to the same fineness as the dolomite can be added. All compositions having iron or chromium (or any other metal of the same group) as main constituents can obviously be used provided they are always reduced to a condition of very great fineness of the order of that indicated above, this constituting one of the essential features of the invention. The proportions of materials to be added vary according to the possibility of reaction and according to the quality of the product to be obtained; these proportions can vary from 0.5 to 5% according to circumstances. These materials of addition are intended to react, during burning, of the dolomite and to constitute ferrites or chromites of magnesia or lime giving to the finished product the necessary qualities of resistance and, in particular, the qualities of resistance to erosion and to hydration.

The materials in question added to the fritted dolomite are intimately mixed with the latter so as to obtain a homogeneous material which is then maintained in a sufficiently hot atmosphere in order to prevent absorption of moisture, particularly when these materials are not to be immediately subjected to the action of presses.

In any case, the said mixture is converted as rapidly as possible into bricks by means of a press exerting high pressures of the order of 300 to 1,000 kgs. per square centimeter (according to the shapes and dimensions of the articles it is desired to obtain).

It is to be noted that this operation is effected in the dry state without addition of any binder, this constituting one of the essential features of the invention. When issuing from the press, these bricks are introduced as rapidly as possible into the burning kiln in order to be gradually raised to a temperature comprised between 1,350° and 1,500° C., which can be effected without taking any special precaution since the bricks are entirely manufactured in the dry state. The said bricks are maintained at this temperature during a relatively long period of time for the purpose of ensuring thorough burning and to give rise to the formation of ferrites or chromites of magnesia or lime. The period of cooling of the bricks in the kiln must be nearly equal to the duration of the burning.

After burning, the articles are not in any way distorted; they present, however, an extremely fine texture, so that they can be affected by sudden changes of temperature and that, on use, their resistance can be slightly reduced. For remedying this inconvenience, it suffices to grind again, in granules of suitable size, a portion of these bricks and to incorporate the said granules, according to a definite percentage, into the pulverulent material above mentioned before the bricks are fed to the brick presses. It is therefore necessary, during manufacture, that a reserve of these granules should be available, which granules can be derived for the greater part from normal waste during manufacture.

From the moment these burnt granules having reacted are available, the bricks manufactured according to the dry process above described are entirely satisfactory and, after a single burning operation, basic refractory products are obtained, which products are hard, compact, perfectly agglomerated, without cracks and have sharp edges as well as all the characteristics of thoroughly fritted dolomite and, moreover, a high resistance to the action of moisture, which resistance arises from ceramic agglomeration and from the formation of a certain percentage of ferrite or chromite of magnesia and lime.

According to the degree of burning of the bricks and according to the percentage of oxide which has been incorporated into the fritted dolomite, the colour of the finished products varies from yellowish brown to dark brown and can even be nearly black. The density obtained depends, moreover, on the pressure exerted by the press and ranges between about two and three.

The product obtained constitutes a new commercial product of very low cost price, having a very high resistance to temperature and erosion and capable, in numerous applications, of constituting a substitute for magnesia bricks, chromium bricks, dolomitic linings and, generally speaking, any basic or neutral fire brick.

Moreover, the process which has been described in the foregoing, owing to the fact that it is entirely effected in the dry state, can be carried out on the spot in kilns or various apparatus by compression and agglomeration owing to a powerful ramming by means of a pneumatic hammer or in any other manner, the burning then taking place when starting the kiln or apparatus exactly as for ordinary linings.

But the application of the features of the present invention to the manufacture of such linings has a positive advantage relatively to the processes for the manufacture of ordinary linings, since a dry lining is obtained which can be heated without taking any special precaution and subsequently constitutes a covering of very great hardness and having a very high resistance to temperature.

Other modifications of details can be resorted to in carrying the invention into practice without departing thereby from the scope of the latter.

What I claim as my invention and desire to secure by Letters Patent is:—

1. The method of producing a dolomite brick, comprising pulverizing dolomite in a dry state, intimately mixing therewith in the dry state a small amount of dry, pulverulent oxide of a metal selected from the iron group, pressing the dry mix, in dry state, under high pressure into desired shape, and then burning the pressed articles while dry, at a high temperature.

2. The method of producing a dolomite brick, comprising pulverizing fritted dolomite in a dry state, intimately mixing therewith in the dry state a small amount of dry, pulverulent oxide of a metal selected from the iron group, pressing the dry mix, in dry state, under high pressures, in the desired shape, and then burning the pressed articles while dry, at a high temperature.

3. The method of producing a dolomite brick, comprising pulverizing dolomite in a dry state until it passes through a sieve of from 6000 to 20,000 meshes per square centimeter, intimately mixing therewith in the dry state a small amount of dry oxide of a metal selected from the iron group and pulverized to approximately the same fineness as the dolomite, pressing the dry mix, in dry state, under high pressures into the desired shape, and then burning the pressed articles while dry, at a high temperature.

4. The method of producing a dolomite brick, comprising pulverizing thoroughly fritted dolomite in a dry state until it passes through a sieve of from 6000 to 20,000 meshes per square centimeter, intimately mixing therewith in the dry state a small amount of dry oxide of a metal selected from the iron group and pulverized to approximately the same fineness as the thoroughly fritted dolomite, pressing the dry mix, in dry state, under high pressures into the desired shape, and then burning the pressed articles while dry, at a high temperature.

5. The method of producing a dolomite brick, comprising pulverizing dolomite in a dry state, intimately mixing therewith in the dry state a small amount of dry, pulverulent oxide of a metal selected from the iron group, pressing the dry mix, in dry state, under pressures ranging from about 300 to approximately 1000 kgs. per square centimeter in the desired shape, and then burning the pressed articles while dry, at a high temperature.

6. The method of producing a dolomite brick, comprising pulverizing dolomite in a dry state until it passes through a sieve of from 6000 to 20,000 meshes per square centimeter, intimately mixing therewith in the dry state a small amount of dry oxide of a metal selected from the iron group and pulverized to approximately the same fineness as the dolomite, pressing the dry mix, in dry state, under pressures ranging from about 300 to approximately 1000 kgs. per square centimeter into the desired shape, and then burning the pressed articles while dry, at a high temperature.

7. The method of producing a dolomite brick, comprising pulverizing thoroughly fritted dolomite in a dry state until it passes through a sieve of from 6000 to 20,000 meshes per square centimeter, intimately mixing therewith in the dry state a small amount of dry oxide of a metal selected from the iron group and pulverized to approximately the same fineness as the thoroughly fritted dolomite, pressing the dry mix, in dry state, under pressures ranging from about 300 to approximately 1000 kgs. per square centimeter into the desired shape, and then burning the pressed articles while dry, at a high temperature.

8. The method of producing a dolomite brick, comprising pulverizing dolomite in a dry state, intimately mixing therewith in the dry state a small amount of dry, pulverulent oxide of a metal selected from the iron group, pressing the dry mix, in dry state, under high pressures into desired shape, and then burning the pressed articles while dry, at a high temperature, to incipient fusion, to obtain a perfect ceramic agglomeration, and to react the oxides with the dolomite.

9. The method of producing a dolomite brick, comprising pulverizing dolomite in a dry state until it passes through a sieve of from 6000 to 20,000 meshes per square centimeter, intimately mixing therewith in the dry state a small amount of dry oxide of a metal selected from the iron group and pulverized to approximately the same fineness as the dolomite, pressing the dry mix, in dry state, under high pressures into the desired shape, and then burning the pressed articles while dry, at a righ temperature, to incipient fusion, to obtain a perfect ceramic agglomeration, and to react the oxides with the dolomite.

10. The method of producing a dolomite brick, comprising pulverizing thoroughly fritted dolomite in a dry state until it passes through a sieve of from 6000 to 20,000 meshes per square centimeter, intimately mixing therewith in the dry state a small amount of dry oxide of a metal selected from the iron group and pulverized to approximately the same fineness as the thoroughly fritted dolomite, pressing the dry mix, in dry state, under pressures ranging from about 300 to approximately 1000 kgs. per square centimeter into the desired shape, and then burning the pressed articles while dry, at a high temperature, to incipient fusion, to obtain a perfect ceramic agglomeration, and to react the oxides with the dolomite.

11. The method of producing a dolomite brick, comprising pulverizing fritted dolomite in a dry state, pulverizing in the dry state an oxide of a metal selected from the iron group, maintaining the pulverized dolomite and the pulverized oxide at a temperature sufficiently high to prevent them from absorbing moisture, intimately mixing in dry manner the dolomite with a small quantity of the oxide, pressing the dry mix, in dry state, under high pressure into desired shape, and then burning the pressed articles while dry, at a high temperature.

12. The method of producing a dolomite brick, comprising pulverizing dolomite in a dry state, intimately mixing therewith in the dry state a small amount of dry, pulverulent oxide of a selected one of the metals iron and chromium, pressing the dry mix, in dry state, under high pressures in the desired shape, and then burning the pressed articles while dry, at a high temperature.

13. The method of producing a dolomite brick, comprising pulverizing dolomite in a dry state, intimately mixing therewith in the dry state about 0.5 to 5.0% of dry, pulverulent oxide of a metal selected from the iron group, pressing the dry mix, in dry state, under high pressures into desired shape, and then burning the pressed articles while dry, at a high temperature.

14. The method of producing a dolomite brick, comprising pulverizing dolomite in a dry state until it passes through a sieve of from 6000 to 20,000 meshes per square centimeter, intimately mixing therewith in the dry state about 0.5 to 5.0% of dry oxide of a metal selected from the iron group and pulverized to approximately the same fineness as the dolomite, pressing the dry mix, in dry state, under high pressures into the desired shape, and then burning the pressed articles while dry, at a high temperature.

15. The method of producing a dolomite brick, comprising pulverizing thoroughly fritted dolomite in a dry state until it passes through a sieve of from 6000 to 20,000 meshes per square centimeter, intimately mixing therewith in the dry state about 0.5 to 5.0% of dry oxide of a metal selected from the iron group and pulverized to approximately the same fineness as the thoroughly fritted dolomite, pressing the dry mix, in dry state, under pressures ranging from about 300 to approximately 1000 kgs. per square centimeter into the desired shape, and then burning the pressed articles while dry, at a high temperature.

16. The method of producing a dolomite brick, comprising pulverizing dolomite in a dry state, intimately mixing therewith in the dry state a small amount of dry, pulverulent oxide of a metal selected from the iron group, pressing the dry mix, in dry state, under high pressures into desired shape, and then burning the pressed articles while dry, at a temperature of about 1350 to 1500° C.

17. The method of producing a dolomite brick, comprising pulverizing dolomite in a dry state until it passes through a sieve of from 6000 to 20,000 meshes per square centimeter, intimately mixing therewith in the dry state a small amount of dry oxide of a metal selected from the iron group and pulverized to approximately the same fineness as the dolomite, pressing the dry mix, in dry state, under high pressures into the desired shape, and then burning the pressed articles while dry, at a temperature of about 1350 to 1500° C.

18. The method of producing a dolomite brick, comprising pulverizing thoroughly fritted dolomite in a dry state until it passes through a sieve of from 6000 to 20,000 meshes per square centimeter, intimately mixing therewith in the dry state about 0.5 to 5.0% of dry oxide of a metal selected from the iron group and pulverized to approximately the same fineness as the thoroughly fritted dolomite, pressing the dry mix, in dry state, under pressures ranging from about 300 to approximately 1000 kgs. per square centimeter into the desired shape, and then burning the pressed articles while dry, at a temperature of about 1350 to 1500° C.

19. The method of producing a dolomite brick, comprising pulverizing dolomite in a dry state, intimately mixing therewith in the dry state a small amount of dry, pulverulent oxide of a metal selected from the iron group, adding thereto a small quantity of granules of previously burned mix, to give strength, pressing the dry mix, in dry state, under high pressure, into the desired shape, and then burning the pressed articles, while dry, at a high temperature until thorough burning has taken place.

20. The method of producing a lining in situ for a kiln and the like, comprising ramming into place, in a dry state and under high pressure, an intimate mixture of dry, finely pulverized dolomite with a small quantity of dry pulverulent oxide of a metal selected from the iron group, and then thoroughly burning the lining in a dry state by placing the kiln into operation.

21. Process of manufacturing refractory bricks of fritted dolomite, comprising mixing, in dry state, the fritted dolomite with materials selected from the group consisting of metallic oxides and substances rich in metallic oxides, grinding the mixture to an impalpable powder such that the powder will traverse a sieve of from 6000 to 20,000 meshes per square centimeter, molding the pulverulent mixture thus obtained, in the absence of all binder and all liquid, under pressures of the order of from 300 to 1000 kgs. per square centimeter, and submitting the molded pieces to a ceramic burning.

JULES ERNOULD.